Jan. 17, 1928.
M. W. KELLOGG
1,656,736
APPARATUS FOR MAKING FLUED OPENINGS IN PIPES AND
SIMILAR CYLINDRICAL BODIES
Filed Aug. 18, 1926
2 Sheets-Sheet 1
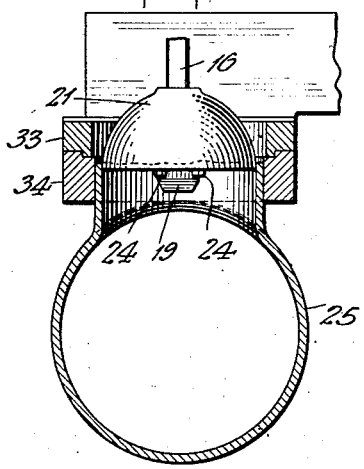
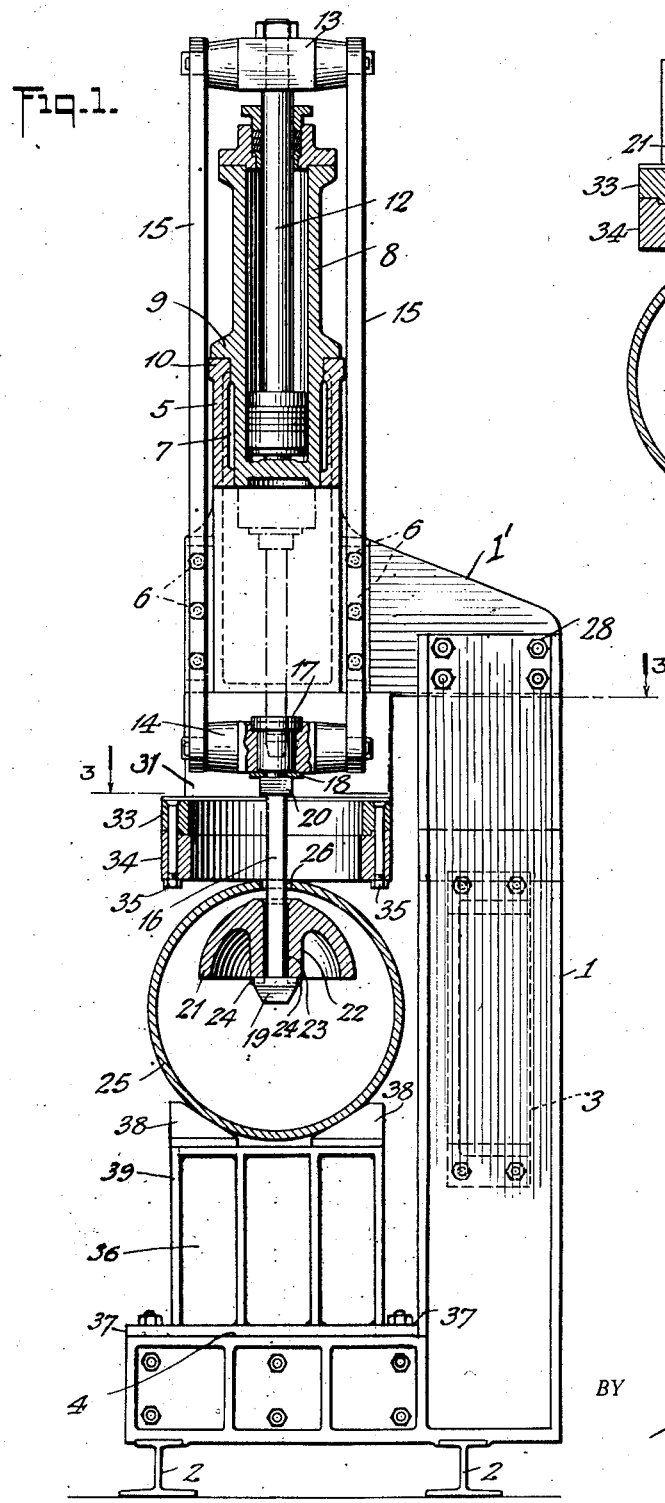
INVENTOR.
MORRIS W. KELLOGG
BY Sheffield & Betts
ATTORNEYS Jan. 17, 1928.                                                                  1,656,736
M. W. KELLOGG
APPARATUS FOR MAKING FLUED OPENINGS IN PIPES AND
SIMILAR CYLINDRICAL BODIES
Filed Aug. 18, 1926                    2 Sheets-Sheet 2
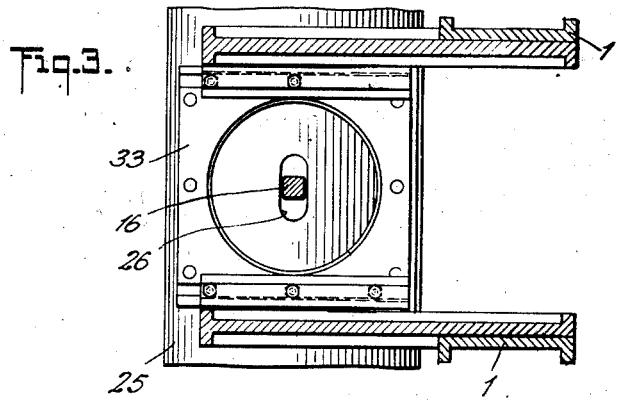
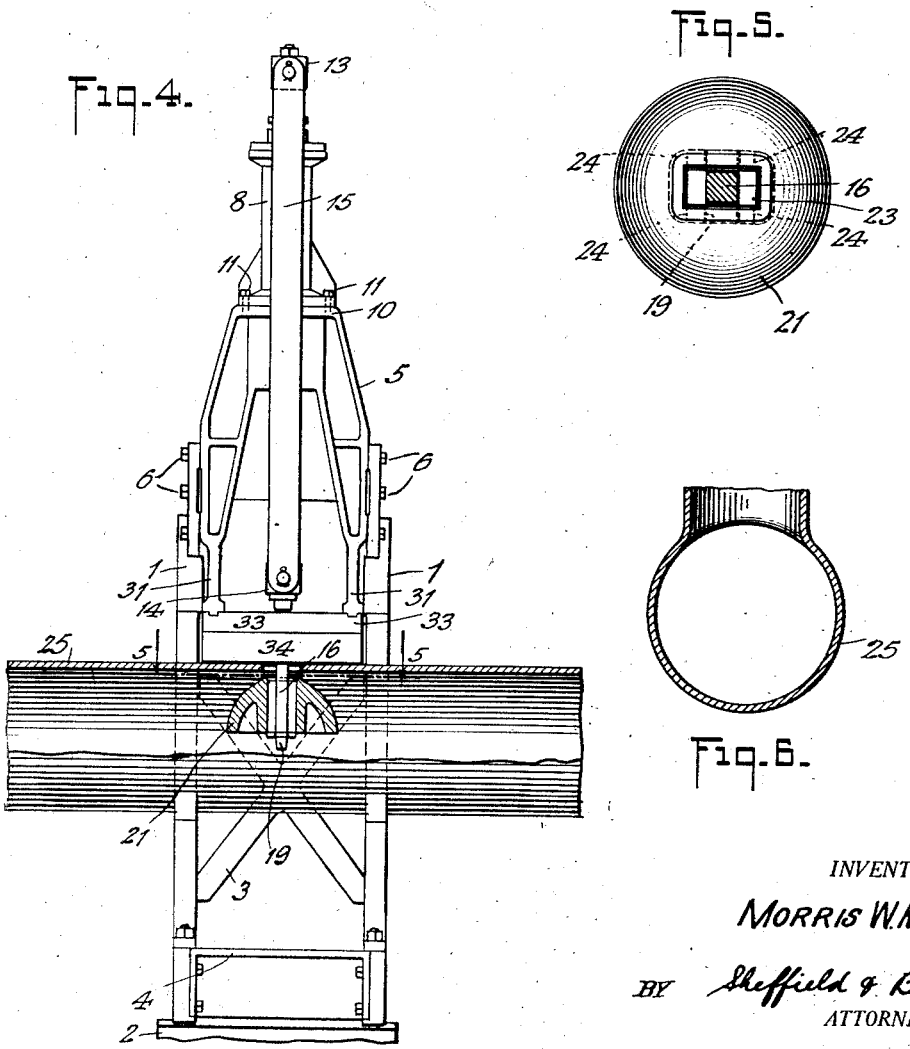
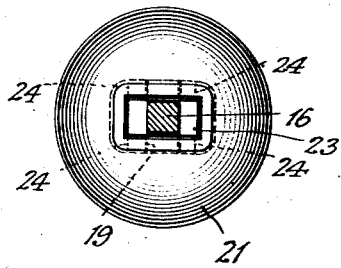
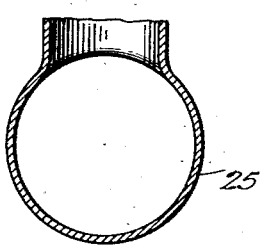
INVENTOR.
MORRIS W. KELLOGG
BY Sheffield & Betts
ATTORNEYS Patented Jan. 17, 1928.

1,656,736

UNITED STATES PATENT OFFICE.

MORRIS W. KELLOGG, OF BROOKVILLE, NEW YORK, ASSIGNOR TO THE M. W. KELLOGG COMPANY, A CORPORATION OF DELAWARE.

APPARATUS FOR MAKING FLUED OPENINGS IN PIPES AND SIMILAR CYLINDRICAL BODIES.

Application filed August 18, 1926. Serial No. 130,093.

This invention relates particularly to apparatus for making flued openings in pipes, whereby they may be made in the sides of pipes, cylinders, and the like, of any desired size or shape, so as to form a flange on the margin of the opening which flange is drawn from the metal adjacent the opening. The invention is particularly adapted for use in connection with tubes of various diameters, such as openings in headers for steam piping for use with boilers, although its use in other types of pipe connections is obvious.

By "flued openings", I desire to be understood as meaning openings in the side of a pipe or similar cylindrical body having a flange extending outwardly from the periphery of the opening. While my invention may also be employed for making such openings in curved surfaces other than in the sides of such pipes and cylinders, I shall refer herein, for simplicity, to all of such openings as "flued openings". While flanged openings have been formed in heads of more or less convex metallic bodies or plates, such as tanks and boiler headers, it has not been considered feasible to make them in the sides of comparatively long pipes or cylinders. Heretofore, the general practice in making openings or outlets in the side of pipes or cylinders, has been to cut a hole of the desired size and shape in the pipe and then rivet, weld or otherwise secure a ring or flanged collar to the edge of the metal around the opening. This requires considerable labor and time and necessitates special collars for different sized holes and pipes of various diameters.

It is the object of the present invention to provide an improved apparatus by which the additional collar, as well as the loss of labor, time and attendant difficulties incident thereto may be eliminated, and by which a stronger and more satisfactory flange may be provided accurately and in less time than heretofore required. According to my invention flued openings may be provided of various sizes and shapes by simply changing the dimensions and operating positions of certain parts, that is, of the die and forming punch, sets of which may be provided for the various sizes of flued openings.

My invention will be better understood from the following description taken in connection with the accompanying drawings and its scope will be pointed out in the appended claims.

In the drawings, illustrating what I now consider the preferred form of my invention, Fig. 1 is a side view, with parts illustrated in section, of apparatus embodying my invention, shown in operative position.

Fig. 2 is a sectional view of the pipe showing how the flange is formed by the punch and die.

Fig. 3 is a horizontal section taken substantially on the line 3—3 of Fig. 1.

Fig. 4 is a front view of the apparatus.

Fig. 5 is a sectional view taken on the line 5—5 of Fig. 4.

Fig. 6 is a sectional view of a pipe having a flange formed thereon.

It will be obvious to those skilled in the art that the spirit of my invention may be embodied in a variety of constructions, but for convenience I have disclosed a construction which I have found to be particularly desirable because of the simplicity of design and the facility of operation.

In the drawings the numeral 1 indicates two parallel L-shaped frame members supported upon girders 2 and held in spaced relation with each other by cross-bracing 3 and by a member 4 securely bolted to the lower horizontal portions of the members 1 as illustrated in the drawings. Two parallel supporting members 1' are positioned upon shoulders formed in the upper part of the frame members 1 as illustrated in Fig. 1, and are fastened thereto by means of the bolts 28.

A member 5, adapted to support the hydraulic cylinder which actuates the punch, is positioned between the supporting members 1' and is securely held in place by means of the bolts 6. The lower extremity of the member 5 is provided with two parallel portions 31, to which the die support is adapted to be secured as illustrated in the drawings and described hereinafter. This cylinder support 5 is provided with an opening 7 in which the cylinder 8 is adapted to be positioned. The cylinder 8 is preferably provided with projections 9 which rest upon shoulders 10, and is held in position by the bolts 11, as illustrated in Fig. 4.

The hydraulic cylinder 8 may be of any standard design suitable for the intended purpose and having a piston 12 connected to the cross bar 13 of a link comprising cross bars 13 and 14 and connecting members 15. The lower cross-bar 14 has a cylindrical opening in which a punch rod 16 is free to rotate.

The upper portion of the punch rod 16 is made cylindrical in form and is provided with an enlarged portion 17 which fits into a correspondingly shaped recess in the top of the cross-bar 14 and a washer 18 is positioned on the punch rod 16 below the cross-bar 14. The punch rod 16 is thus free to rotate with respect to the cross-bar 14 but movement in the direction of its axis is constrained to the movement of the link and the piston 12.

The lower portion of the punch rod 16 is preferably of approximately square cross section and is provided at its lower end with an enlarged portion 19 having a cross section of the same thickness as the punch rod 16 but having a greater cross-sectional length. Just below the position occupied by the washer 18 the punch rod 16 is provided with a square section 20 adapted to be engaged by a wrench whereby the punch rod 16 may be rotated within the cross-bar 14.

The numeral 21 indicates, in the particular embodiment illustrated, a substantially hemispherical punch head or member whose greatest diameter equals the inside diameter of the desired flued openings. The central portion 22 of the punch head 21 has a rectangular hole 23 corresponding in size to the enlarged portion 19 of the punch rod 16. The lower surface of the central portion 22 is provided with four spaced projections 24 as illustrated in the drawings.

A die support 33 which preferably is in the form of an annulus is fastened to the portion 31 in any suitable manner, such as by means of bolts, not shown in the drawings, and the die 34 is secured to the die support by means of the bolts 35.

While the pipe 25 is being operated to form the desired flanged opening it may be held in position between two inclined blocks 38 supported upon a platform 36 having stiffening ribs 39 and a front piece 37 bolted to the member 4 as illustrated in Fig. 1.

While I have described the construction of the punch actuating cylinder specifically and have referred to it as being hydraulic, it is to be understood that any suitable type of apparatus may be employed for the same purpose and may be operated by any other fluid pressure medium or other power means.

In view of the foregoing detailed description of my apparatus the method and operation thereof will be readily understood. The hole 26 is first made in the pipe 25 at the point where the desired flued opening is to be made. Its size and shape depend chiefly upon the size and shape of the flued opening, but obviously it must be such size as to permit the entry of the punch rod 16. This operation is preferably carried out before placing of the pipe in the above described apparatus. The pipe 25 is placed on the inclined blocks 38, which are positioned with respect to the pipe in accordance with the size thereof. The pipe is then placed in a convenient position so that the margin of the opening may have a heating device in the form of a gas or oil burner applied thereto. When the section of the pipe to be provided with the flued opening has been sufficiently heated the burner is removed and the pipe positioned to bring the hole or opening beneath the center of the cylinder.

The punch head 21 may be placed in operative position upon the punch rod 16 in the following manner: The punch head 21, supported by tongs or on a movable carriage or other suitable means adapted for this purpose, is introduced longitudinally within the pipe 25 to a point opposite the hole 26 therein. The punch rod 16 is turned by means of a wrench fitted to the squared section 20 until the corners of the enlarged portion 19 are in alignment with the corresponding corners of the hole 23 and the punch rod is then forced down through the hole 26 and through the punch head 21 until the upper surface of the enlarged portion 19 extends beyond the projections 24. The punch rod 16 is given a quarter turn and the upper surface of the enlarged portion 19 is brought into contact with the punch 21 so that the latter is prevented from turning with respect to the punch rod 16 by the projections 24. The piston 12 is then caused to move upward by the admission of the hydraulic fluid into the cylinder 8 thus pulling the punch head 21 upward into and through the die 34 as illustrated in Fig. 2, thus forming the desired flued opening by an expansion and bending of the heated margin of the opening.

Having thus described this form of my invention, I do not wish to be understood as being limited to the details and arrangements of the parts set forth, for various changes may be made by those skilled in the art without departing from the spirit and scope of my invention.

What I claim is:

1. Apparatus for making flanged openings in the side of an elongated hollow body, comprising in combination, a die support, a die, a punch head adapted to be inserted longitudinally within said body and provided with a central bearing having a slot therein, a key member adapted to be inserted within said slot and power means connected with said member and located without said body for pulling said punch head through said die.

2. Apparatus for making flanged openings in the side of an elongated hollow body, comprising in combination, a die support, a die, a punch head adapted to be inserted longitudinally within said body and provided with a central bearing having an elongated opening therein, a punch rod having lateral projections thereon adapted to be passed through said opening and be turned at right angles to lock said head thereto, and power means connected with said rod and located without said body for pulling said punch head through said die.

3. Apparatus for making flanged openings in the side of an elongated hollow body, comprising in combination, a die support, a die, a punch head adapted to be inserted longitudinally within said body and provided with a central bearing having an elongated opening therein and provided with spaced projections on its lower surface, a punch rod provided with lateral projections and adapted to be passed through said opening and be positioned between said projections to lock said head to said rod, and power means connected with said rod and located without said body for pulling said punch head through said die.

Signed at New York, this 16th day of August, 1926.

MORRIS W. KELLOGG.